(12) United States Patent
Sishtla et al.

(10) Patent No.: US 9,019,145 B1
(45) Date of Patent: Apr. 28, 2015

(54) GROUND CLUTTER REJECTION FOR WEATHER RADAR

(75) Inventors: Venkata A. Sishtla, Marion, IA (US); Daniel L. Woodell, Cedar Rapids, IA (US); Mark C. Fersdahl, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 123 days.

(21) Appl. No.: 13/183,314

(22) Filed: Jul. 14, 2011

(51) Int. Cl.
*G01S 13/95* (2006.01)
*G01S 7/28* (2006.01)
*G01S 13/94* (2006.01)

(52) U.S. Cl.
CPC ............. *G01S 13/953* (2013.01); *G01S 7/2813* (2013.01); *G01S 13/94* (2013.01)

(58) Field of Classification Search
CPC ...... G01S 13/953; G01S 13/94; G01S 7/2813
USPC ...... 342/26 R, 26 B, 73–74, 79–81, 159, 162, 342/427, 465
See application file for complete search history.

(56) References Cited

U.S. PATENT DOCUMENTS

| | | | |
|---|---|---|---|
| 2,416,155 A | 2/1947 | Chubb | |
| 2,929,059 A | 3/1960 | Parker | |
| 2,930,035 A | 3/1960 | Alterkruse | |
| 2,948,892 A | 8/1960 | White | |
| 2,965,894 A | 12/1960 | Sweeney | |
| 2,994,966 A | 8/1961 | Senitsky et al. | |
| 3,031,660 A | 4/1962 | Young | |
| 3,049,702 A | 8/1962 | Schreitmueller | |
| 3,064,252 A | 11/1962 | Varela | |
| 3,070,795 A | 12/1962 | Chambers | |
| 3,072,903 A | 1/1963 | Meyer | |
| 3,107,351 A | 10/1963 | Milam | |
| 3,113,310 A | 12/1963 | Standing | |
| 3,129,425 A | 4/1964 | Sanner | |
| 3,153,234 A | 10/1964 | Begeman et al. | |
| 3,175,215 A | 3/1965 | Blasberg et al. | |
| 3,212,088 A | 10/1965 | Alexander et al. | |
| 3,221,328 A | 11/1965 | Walter | |
| 3,241,141 A | 3/1966 | Wall | |
| 3,274,593 A | 9/1966 | Varela et al. | |
| 3,325,807 A | 6/1967 | Burns et al. | |
| 3,339,199 A | 8/1967 | Pichafroy | |
| 3,397,397 A | 8/1968 | Barney | |
| 3,448,450 A | 6/1969 | Alfandari et al. | |
| 3,618,090 A | 11/1971 | Garrison | |

(Continued)

OTHER PUBLICATIONS

Office Action for U.S. Appl. No. 12/167,203, mail date Sep. 21, 2012, 6 pages.

(Continued)

*Primary Examiner* — John B Sotomayor
*Assistant Examiner* — Marcus Windrich
(74) *Attorney, Agent, or Firm* — Angel N. Gerdzhikov; Donna P. Suchy; Daniel M. Barbieri

(57) ABSTRACT

A weather radar system is coupled to a weather radar antenna. The weather radar system includes a processor for combining or summing portions of the radar return data to obtain a null. The processor associates the null with the ground (e.g., steers the null toward ground or processes data so that the null corresponds to ground) to obtain a null to alleviate ground clutter when sensing weather. The null can be a single null or multiple nulls associated with different ranges.

18 Claims, 8 Drawing Sheets

(56) References Cited

U.S. PATENT DOCUMENTS

| | | |
|---|---|---|
| 3,680,094 A | 7/1972 | Bayle et al. |
| 3,739,380 A | 6/1973 | Burdic et al. |
| 3,781,878 A | 12/1973 | Kirkpatrick |
| 3,810,175 A | 5/1974 | Bell |
| 3,815,132 A | 6/1974 | Case et al. |
| 3,885,237 A | 5/1975 | Kirkpatrick |
| 3,956,749 A | 5/1976 | Magorian |
| 4,024,537 A | 5/1977 | Hart |
| 4,058,701 A | 11/1977 | Gruber et al. |
| 4,058,710 A | 11/1977 | Altmann |
| 4,277,845 A | 7/1981 | Smith et al. |
| 4,435,707 A | 3/1984 | Clark |
| 4,481,519 A | 11/1984 | Margerum |
| 4,532,515 A | 7/1985 | Cantrell et al. |
| 4,628,318 A | 12/1986 | Alitz |
| 4,646,244 A | 2/1987 | Bateman et al. |
| 4,649,388 A * | 3/1987 | Atlas ..................... 342/26 D |
| 4,685,149 A | 8/1987 | Smith et al. |
| 4,760,396 A | 7/1988 | Barney et al. |
| 4,843,398 A | 6/1989 | Houston et al. |
| 4,924,401 A | 5/1990 | Bice et al. |
| 4,939,513 A | 7/1990 | Paterson et al. |
| 4,951,059 A | 8/1990 | Taylor, Jr. |
| 4,953,972 A | 9/1990 | Zuk |
| 4,965,573 A * | 10/1990 | Gallagher et al. ............ 340/968 |
| 5,047,781 A | 9/1991 | Bleakney |
| 5,049,886 A | 9/1991 | Seitz et al. |
| 5,173,703 A * | 12/1992 | Mangiapane et al. ...... 342/25 A |
| 5,175,554 A | 12/1992 | Mangiapane et al. |
| 5,198,819 A | 3/1993 | Susnjara |
| 5,247,303 A | 9/1993 | Cornelius et al. |
| 5,311,183 A * | 5/1994 | Mathews et al. ............ 342/26 B |
| 5,332,998 A | 7/1994 | Avignon et al. |
| 5,345,241 A | 9/1994 | Huddle |
| 5,539,409 A * | 7/1996 | Mathews et al. ............ 342/26 B |
| 5,559,515 A | 9/1996 | Alimena et al. |
| 5,559,518 A | 9/1996 | Didomizio |
| 5,592,178 A | 1/1997 | Chang et al. |
| 5,820,080 A | 10/1998 | Eschenbach |
| 5,831,570 A * | 11/1998 | Ammar et al. .............. 342/26 B |
| 5,867,119 A | 2/1999 | Corrubia et al. |
| 5,894,286 A | 4/1999 | Morand et al. |
| 5,920,276 A | 7/1999 | Frederick |
| 5,923,279 A | 7/1999 | Bamler et al. |
| 5,936,575 A | 8/1999 | Azzarelli et al. |
| 5,945,926 A | 8/1999 | Ammar et al. |
| 6,023,240 A | 2/2000 | Sutton |
| 6,061,022 A | 5/2000 | Menegozzi et al. |
| 6,064,942 A | 5/2000 | Johnson et al. |
| 6,075,484 A | 6/2000 | Daniel et al. |
| 6,128,553 A | 10/2000 | Gordon et al. |
| 6,150,901 A | 11/2000 | Auken |
| 6,154,151 A | 11/2000 | McElreath et al. |
| 6,154,169 A | 11/2000 | Kuntman |
| 6,157,339 A | 12/2000 | Sato et al. |
| 6,157,891 A | 12/2000 | Lin |
| 6,163,021 A | 12/2000 | Mickelson |
| 6,166,661 A | 12/2000 | Anderson et al. |
| 6,169,770 B1 | 1/2001 | Henely |
| 6,178,391 B1 | 1/2001 | Anderson et al. |
| 6,184,816 B1 | 2/2001 | Zheng et al. |
| 6,188,330 B1 * | 2/2001 | Glover ........................ 340/968 |
| 6,194,980 B1 | 2/2001 | Thon |
| 6,201,494 B1 | 3/2001 | Kronfeld |
| 6,204,806 B1 | 3/2001 | Hoech |
| 6,208,284 B1 | 3/2001 | Woodell et al. |
| 6,236,351 B1 | 5/2001 | Conner et al. |
| 6,259,400 B1 | 7/2001 | Higgins et al. |
| 6,266,114 B1 | 7/2001 | Skarohlid |
| 6,281,832 B1 | 8/2001 | McElreath |
| 6,285,298 B1 | 9/2001 | Gordon |
| 6,285,337 B1 | 9/2001 | West et al. |
| 6,285,926 B1 | 9/2001 | Weiler et al. |
| 6,317,872 B1 | 11/2001 | Gee et al. |
| 6,340,946 B1 | 1/2002 | Wolfson et al. |
| 6,345,127 B1 | 2/2002 | Mitchell |
| 6,359,585 B1 | 3/2002 | Bechman et al. |
| 6,373,418 B1 | 4/2002 | Abbey |
| 6,374,286 B1 | 4/2002 | Gee et al. |
| 6,377,202 B1 | 4/2002 | Kropfli et al. |
| 6,377,892 B1 | 4/2002 | Johnson et al. |
| 6,388,607 B1 | 5/2002 | Woodell |
| 6,388,608 B1 | 5/2002 | Woodell et al. |
| 6,421,000 B1 | 7/2002 | McDowell |
| 6,424,288 B1 | 7/2002 | Woodell |
| 6,426,717 B1 | 7/2002 | Maloratsky |
| 6,426,720 B1 * | 7/2002 | Ross et al. ..................... 342/372 |
| 6,441,773 B1 | 8/2002 | Kelly et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,456,238 B1 | 9/2002 | Posey |
| 6,462,703 B2 | 10/2002 | Hedrick |
| 6,473,026 B1 | 10/2002 | Ali-Mehenni et al. |
| 6,473,037 B2 | 10/2002 | Vail et al. |
| 6,473,240 B1 | 10/2002 | Dehmlow |
| 6,492,934 B1 | 12/2002 | Hwang et al. |
| 6,512,476 B1 | 1/2003 | Woodell |
| 6,520,056 B1 | 2/2003 | Nemeth et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,590,528 B1 | 7/2003 | DeWulf |
| 6,600,443 B2 | 7/2003 | Landt |
| 6,603,425 B1 * | 8/2003 | Woodell ..................... 342/26 R |
| 6,650,275 B1 | 11/2003 | Kelly et al. |
| 6,650,291 B1 | 11/2003 | West et al. |
| 6,690,298 B1 | 2/2004 | Barber et al. |
| 6,690,299 B1 | 2/2004 | Suiter |
| 6,697,008 B1 | 2/2004 | Sternowski |
| 6,710,663 B1 | 3/2004 | Berquist |
| 6,714,186 B1 | 3/2004 | Mosier et al. |
| 6,724,344 B1 | 4/2004 | Stockmaster et al. |
| 6,738,011 B1 | 5/2004 | Evans |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,771,626 B1 | 8/2004 | Golubiewski et al. |
| 6,782,392 B1 | 8/2004 | Weinberger et al. |
| 6,804,614 B1 | 10/2004 | McGraw et al. |
| 6,806,846 B1 | 10/2004 | West |
| 6,807,538 B1 | 10/2004 | Weinberger et al. |
| 6,813,777 B1 | 11/2004 | Weinberger et al. |
| 6,819,983 B1 | 11/2004 | McGraw |
| 6,822,617 B1 | 11/2004 | Mather et al. |
| 6,825,804 B1 | 11/2004 | Doty |
| 6,839,017 B1 | 1/2005 | Dillman |
| 6,850,185 B1 | 2/2005 | Woodell |
| 6,862,323 B1 | 3/2005 | Loper |
| 6,879,280 B1 | 4/2005 | Bull et al. |
| 6,882,302 B1 | 4/2005 | Woodell et al. |
| 6,918,134 B1 | 7/2005 | Sherlock et al. |
| 6,933,885 B1 | 8/2005 | Stockmaster et al. |
| 6,938,258 B1 | 8/2005 | Weinberger et al. |
| 6,950,062 B1 | 9/2005 | Mather et al. |
| 6,959,057 B1 | 10/2005 | Tuohino |
| 6,972,727 B1 | 12/2005 | West et al. |
| 6,977,608 B1 | 12/2005 | Anderson et al. |
| 6,990,022 B2 | 1/2006 | Morikawa et al. |
| 6,995,726 B1 | 2/2006 | West et al. |
| 6,998,908 B1 | 2/2006 | Sternowski |
| 6,999,022 B1 | 2/2006 | Vesel et al. |
| 6,999,027 B1 | 2/2006 | Stockmaster |
| 7,002,546 B1 | 2/2006 | Stuppi et al. |
| 7,028,304 B1 | 4/2006 | Weinberger et al. |
| 7,034,753 B1 | 4/2006 | Elsallal et al. |
| 7,069,120 B1 | 6/2006 | Koenck et al. |
| 7,089,092 B1 | 8/2006 | Wood et al. |
| 7,092,645 B1 | 8/2006 | Sternowski |

(56) References Cited

U.S. PATENT DOCUMENTS

| | | |
|---|---|---|
| 7,109,912 B1 | 9/2006 | Paramore et al. |
| 7,109,913 B1 | 9/2006 | Paramore et al. |
| 7,129,885 B1 | 10/2006 | Woodell et al. |
| 7,145,501 B1 | 12/2006 | Manfred et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,170,959 B1 | 1/2007 | Abbey |
| 7,196,329 B1 | 3/2007 | Wood et al. |
| 7,205,933 B1 | 4/2007 | Snodgrass |
| 7,218,268 B2 | 5/2007 | Vandenberg |
| 7,219,011 B1 | 5/2007 | Barber |
| 7,242,343 B1 | 7/2007 | Woodell |
| 7,242,345 B2 | 7/2007 | Raestad et al. |
| 7,250,903 B1 | 7/2007 | McDowell |
| 7,269,657 B1 | 9/2007 | Alexander et al. |
| 7,272,472 B1 | 9/2007 | McElreath |
| 7,280,068 B2 | 10/2007 | Lee et al. |
| 7,289,058 B2 | 10/2007 | Shima |
| 7,292,178 B1 | 11/2007 | Woodell et al. |
| 7,292,180 B2 | 11/2007 | Schober |
| 7,295,150 B2 | 11/2007 | Burlet et al. |
| 7,301,496 B2 | 11/2007 | Honda et al. |
| 7,307,583 B1 | 12/2007 | Woodell et al. |
| 7,317,427 B2 | 1/2008 | Pauplis et al. |
| 7,321,332 B2 | 1/2008 | Focke et al. |
| 7,373,223 B2 | 5/2008 | Murphy |
| 7,379,796 B2 | 5/2008 | Walsdorf et al. |
| 7,423,578 B1 | 9/2008 | Tietjen |
| 7,474,262 B2 | 1/2009 | Alland |
| 7,479,920 B2 | 1/2009 | Niv |
| 7,609,200 B1 | 10/2009 | Woodell et al. |
| 7,612,706 B2 | 11/2009 | Honda et al. |
| 7,616,150 B1 | 11/2009 | Woodell |
| 7,633,430 B1 | 12/2009 | Wichgers et al. |
| 7,639,175 B1 * | 12/2009 | Woodell ............... 342/123 |
| 7,783,427 B1 | 8/2010 | Woodell et al. |
| 7,783,429 B2 | 8/2010 | Walden et al. |
| 7,791,529 B2 | 9/2010 | Filias et al. |
| 7,808,422 B1 | 10/2010 | Woodell et al. |
| 7,843,380 B1 | 11/2010 | Woodell |
| 7,859,448 B1 | 12/2010 | Woodell et al. |
| 7,859,449 B1 | 12/2010 | Woodell et al. |
| 7,864,103 B2 | 1/2011 | Weber et al. |
| 7,889,117 B1 | 2/2011 | Woodell et al. |
| 7,965,225 B1 | 6/2011 | Dickerson et al. |
| 8,077,078 B1 | 12/2011 | Woodell et al. |
| 2003/0160718 A1 | 8/2003 | Nagasaku |
| 2004/0264549 A1 | 12/2004 | Hoole |
| 2006/0164284 A1 | 7/2006 | Pauplis et al. |
| 2007/0001897 A1 | 1/2007 | Alland |
| 2007/0008214 A1 * | 1/2007 | Wasiewicz ............... 342/159 |
| 2007/0013575 A1 | 1/2007 | Lee et al. |
| 2008/0018524 A1 | 1/2008 | Christianson |
| 2008/0111731 A1 | 5/2008 | Hubbard et al. |

OTHER PUBLICATIONS

Office Action for U.S. Appl. No. 12/976,871, mail date Jul. 10, 2012, 4 pages.
Office Action for U.S. Appl. No. 12/976,871, mail date Nov. 21, 2012, 5 pages.
Office Action for U.S. Appl. No. 13/474,559, mail date Dec. 28, 2012, 8 pages.
Office Action regarding U.S. Appl. No. 12/976,871, mail date Feb. 15, 2012, 8 pages.
U.S. Appl. No. 11/851,323, filed Sep. 6, 2007, Rockwell Collins, Inc.
U.S. Appl. No. 12/167,203, filed Jul. 2, 2008, Rockwell Collins, Inc.
U.S. Appl. No. 12/180,293, filed Jul. 25, 2008, Rockwell Collins, Inc.
Skolnik, Radar Handbook, 1990, 23 pages.
Skolnik, Introduction to Radar Systems, 2001, 3 pages.
Technical Standard Order, TSO-C115b, Airborne Area Navigation Equipment Using Multi-Sensor Inputs, Department of Transportation, Federal Aviation Administration, Sep. 30, 1994, 11 pages.
Wang et al., A Simple Based on DSP Antenna Controller of Weather Radar, 2001 CIE International Conference, 4 pages.
Office Action for U.S. Appl. No. 13/474,559, mail date Aug. 28, 2013, 10 pages.

* cited by examiner

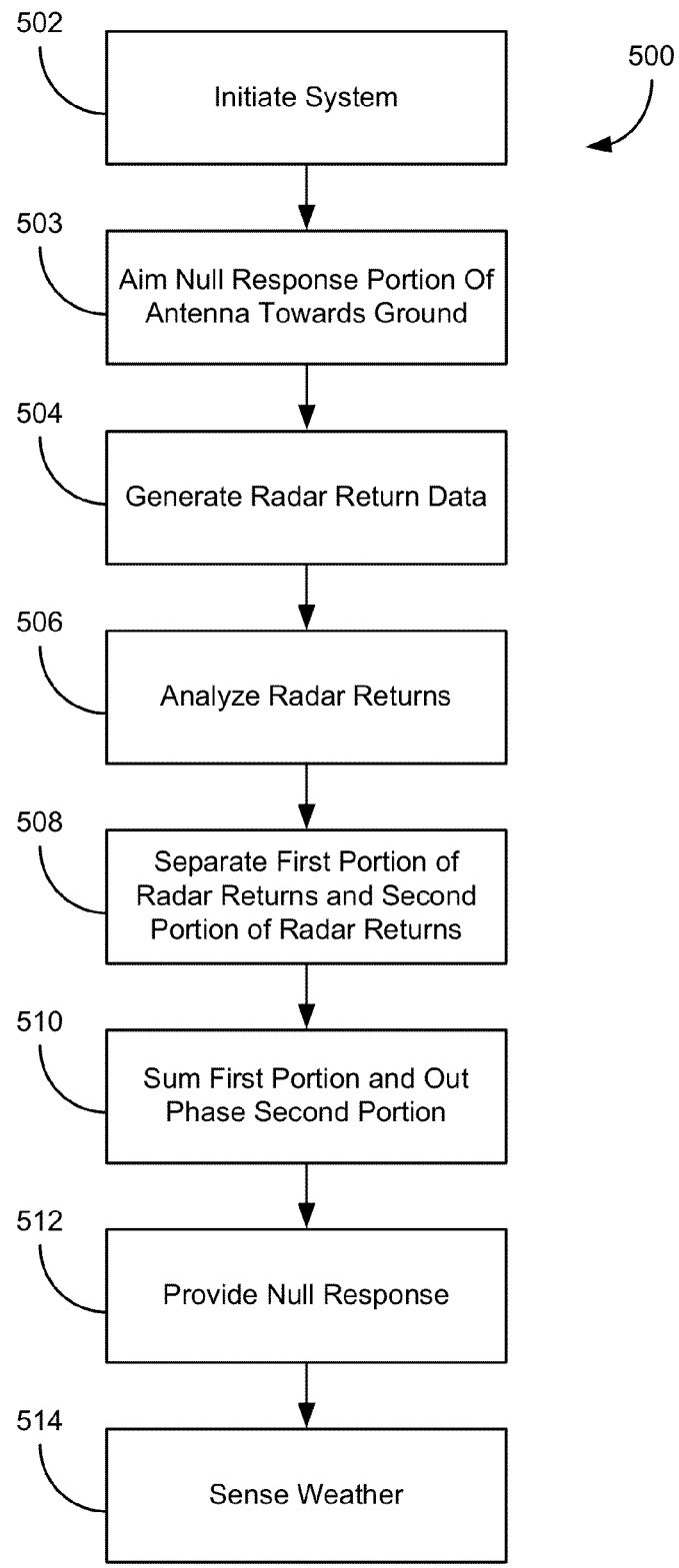

GROUND CLUTTER REJECTION FOR WEATHER RADAR

BACKGROUND

The present disclosure relates generally to the field of weather radar. The present disclosure relates more specifically to the field of ground clutter rejection in weather radar.

Weather radar systems are often used on-board an aircraft to sense weather and other hazards. Ground clutter rejection is utilized for many on-board radar functions including weather radar functions and terrain awareness functions. In one particular application, detecting low lying windshear can be difficult if the region of interest is embedded in strong ground clutter.

Conventionally, ground clutter rejection of about 70 dB is required to detect low-level windshear. The 70 dB ground clutter rejection can be achieved by a combination of positioning the ground clutter responses on the skirt of an antenna beam and frequency domain editing when a large antenna is utilized. In weather radar applications that use smaller antennas (diameters less than 18 inches), the antennas have to be tilted higher (less towards Earth due to their wider beam) to achieve the required ground clutter rejection. However, tilting the antenna higher reduces the signal-to-noise ratio associated with weaker weather returns from low altitude outflows, thereby requiring more rejection using frequency domain editing. In addition, as the region of space sampled by the radar beam increases in height above the ground for higher tilt values, the peak velocity of the outflow is not measured. The peak outflow must then be estimated with a model which produces uncertainties in the outflow estimation process.

Conventional methods of using frequency domain editing utilize notch filters which can cause a decrease in signal-to-noise ratio of weather returns. The decrease in signal-to-noise ratio can be particularly disadvantageous when signals of interest are associated with low reflectivity weather phenomena.

Therefore, there is a need for a weather radar system that is optimized for performing windshear detection with smaller antennas sizes. Further still, there is a need for a low cost system for and method of rejecting ground clutter. Yet further, there is a need to detect windshear at lower reflectivity levels (e.g., less than 0 dBz, such as, −20 dBz).

There is also a need for a system for and method of more accurate weather detection in an environment including ground clutter. There is also a need for a radar system for and method of more accurately rejecting ground clutter. Further, there is a need for a method of and system for detecting windshear or other hazards using smaller antennas. Further still, there is a need for a low cost, radar-based weather sensor that can detect windshear or other hazards with a small antenna in the presence of ground clutter. Yet further, there is a need for a weather sensor that is less susceptible to noise issues and ground clutter effects.

SUMMARY

An exemplary embodiment relates to a method of using an airborne weather radar. The method includes combining at least two radar returns to form a null. The null is associated with the ground and preferably alleviates ground clutter. The method also includes sensing weather.

Another exemplary embodiment relates to a weather radar system coupled to a weather radar antenna. The weather radar systems includes a receive circuit for receiving radar returns received by the antenna and providing radar return data. The weather radar system also includes a processor coupled to the receive circuit and receiving the radar return data. The processor directs the antenna so that a null is correlated with ground during weather sensing to reduce ground clutter.

Another exemplary embodiment relates to an apparatus for sensing weather. The apparatus includes means for sampling weather radar return data associated with the scan; and means for associating a null with the ground. The null reduces ground clutter associated with the weather radar return data.

BRIEF DESCRIPTION OF THE DRAWINGS

Exemplary embodiments are described below with reference to the accompanying drawings, wherein like numerals denote like elements and:

FIG. 5 is a flow chart of a method of sensing weather using an airborne weather radar, according to an exemplary embodiment;

DETAILED DESCRIPTION OF THE EXEMPLARY EMBODIMENTS

Although the description below contains specific embodiments, these embodiments are utilized to illustrate only some of the exemplary embodiments of this disclosure and should not be construed as limiting the scope of the disclosure. The scope of this disclosure should be determined by the claims, their legal equivalents and the fact that it fully encompasses other embodiments which may become apparent to those skilled in the art. A method or device does not have to address each and every problem to be encompassed by the present disclosure. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

Figure 1:
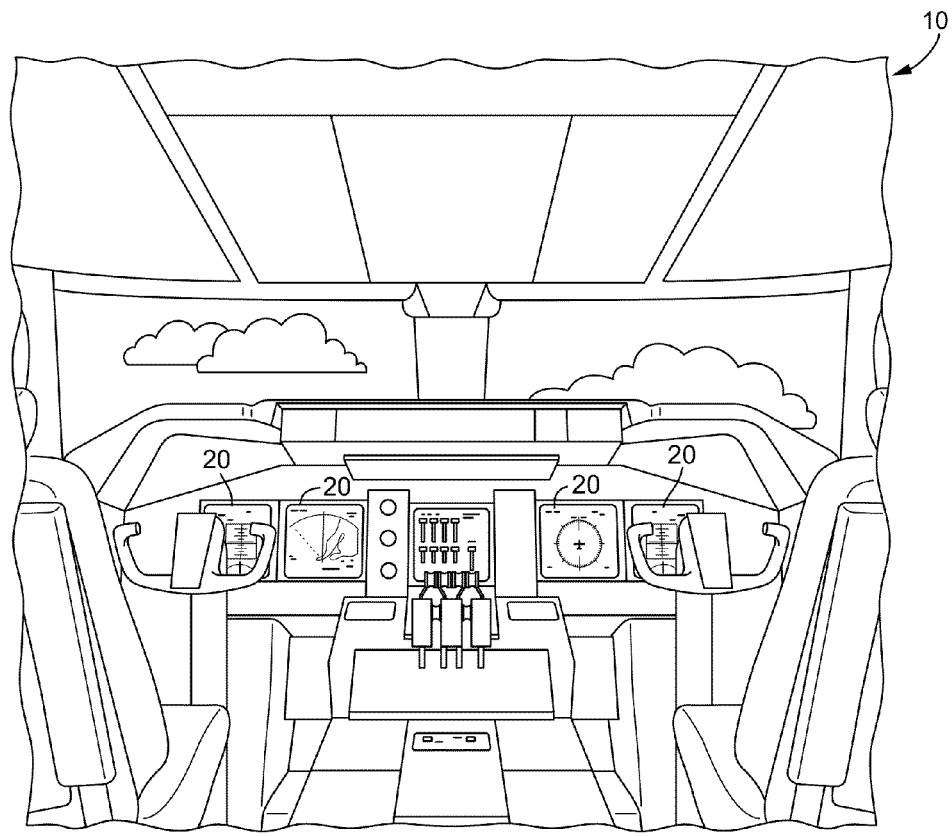
FIG. 1 is a perspective view schematic illustration of an aircraft control center, according to one exemplary embodiment.

Referring to FIG. 1, an illustration of an aircraft control center or cockpit 10 is shown, according to one exemplary embodiment. Aircraft control center 10 includes flight displays 20. The pilot may use flight displays 20 to increase visual range and to enhance decision-making abilities. In an exemplary embodiment, flight displays 20 may be configured to show weather, terrain, fixed obstacles, variable obstacles (e.g., other aircraft), flight characteristics (e.g., altitude or speed), or any combination thereof.

Figure 2:
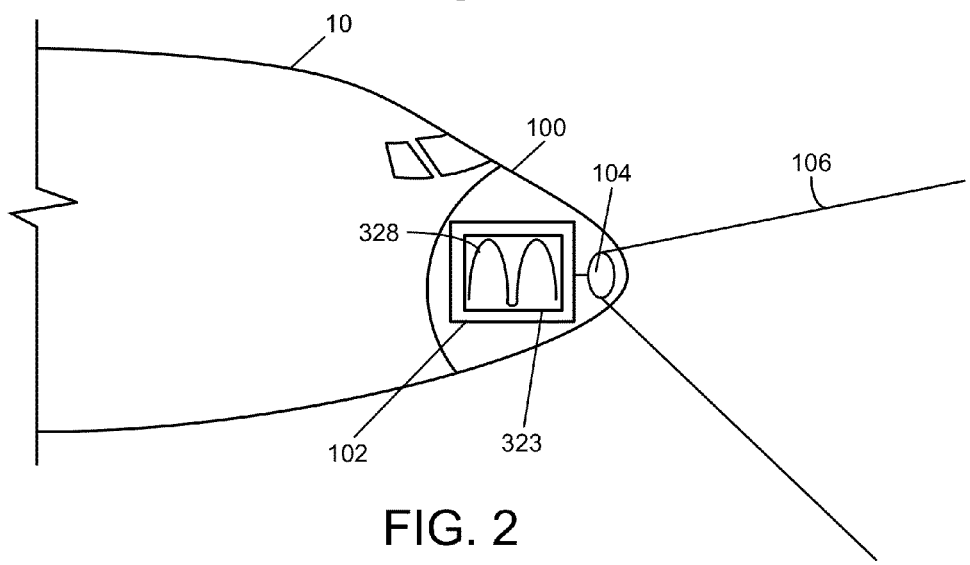
FIG. 2 is a side view schematic illustration of the nose of an aircraft including the aircraft control center of FIG. 1, according to an exemplary embodiment.

In FIG. 2, the front of an aircraft is shown with aircraft control center 10 and nose 100, according to an exemplary embodiment. A radar system 102 is generally located inside the nose 100 of the aircraft. According to other exemplary embodiments, radar system 102 may be located on the top of the aircraft or on the tail of the aircraft. In an exemplary embodiment, radar system 102 can be a weather radar system and is adapted to use a null response to determine elevation estimates and sense weather events.

Advantageously, system 102 can be utilized to sense a variety of weather phenomenon, including windshear and other hazards using an antenna 104. An electronic and/or mechanical steering mechanism can be used to steer antenna 104 according to azimuth angles and tilt angles. In a preferred embodiment, system 102 is capable of detecting low-lying windshear in the presence of strong or very strong ground clutter. System 102 advantageously utilizes a null response 323 associated with weather radar returns to reduce ground clutter. Null response 323 can be formed proactively or after reception by system 102. Null response 323 is preferably formed so that a null is associated with ground. As discussed below, various transmitters, receiving and processing techniques can be used to form null response 323 which can take a number of shapes. Null response 323 can be formed by transmitting on different parts of antenna 104, receiving on different parts of antenna 104, or combinations thereof. A monopulse radar system can also be used to form null response 323.

In addition, system 102 can utilize additional filtering to reject or reduce ground clutter, such as frequency filtering and notch filters according to alternative embodiments. Frequency filtering can include frequency domain editing.

In one preferred embodiment, 70 dB of clutter rejection can be achieved by steering a null 327 in response 323 towards the ground clutter in radar time so that the null effectively rejects ground clutter. Null 327 can be formed using a split aperture antenna technique in one embodiment. Estimates from vertical or partially vertical scans can be phased and combined to produce null 327 in one embodiment. By rejecting the ground clutter in antenna angle space, the loss in signal-to-noise ratio due to notch filtering can be advantageously minimized in one embodiment.

In one preferred embodiment, the process can use antenna differentiation processes discussed in U.S. Pat. No. 7,639,175, U.S. Pat. No. 7,843,380 and U.S. Pat. No. 7,616,150, incorporated herein by reference in their entireties, but preferably uses sharper nulls for better ground clutter detection.

In a preferred embodiment, antenna 104 associated with radar beam 106 is a smaller antenna, such as those suitable for business and regional systems (BRS) aircraft (e.g., antenna 104 can have an 18 inch diameter or less). In one preferred embodiment, antenna 104 can have a diameter of between 12 and 14 inches or 12 inches or less for X-band radars. Radar antenna 104 can be a weather radar antenna of any size. In one embodiment, antenna 104 is a weather radar antenna having an area of less than 25 square inches.

Alternatively, radar antenna 104 can be an electronically steered antenna array. In such an embodiment, antenna 104 can include two receivers or can receive encoded signals (e.g., a top coded output and a bottom coded output).

System 102 preferably achieves filtering while retaining windshear return data for the performance of gradient assessments. System 102 can utilize a variety of algorithms for detecting windshear and other hazards using the weather radar return data associate with null response 323. Exemplary algorithms or software routines for windshear and other hazard detection are utilized on RDR-4000 and WXR-2100 weather radar systems.

In an exemplary embodiment, the radar returns received by radar antenna 104 associated with radar system 102 can be separated into two or more portions. The first portion of the returns can relate to data from one area, while a second portion of the returns can relate to data from a different area. In a preferred embodiment, the first portion of the returns may relate to a first portion of weather radar antenna 104, and the second portion of the returns may relate to a second portion of the weather radar antenna 104. The first portion is preferably different than (e.g., intersects with, includes but is not the same as, or is exclusive of) the second portion and can be combined with the second portion to achieve a null response. In a preferred embodiment, the first portion and the second portion are separated and combined in the receive circuit or processor of radar system 102 (FIG. 3).

Figure 3:
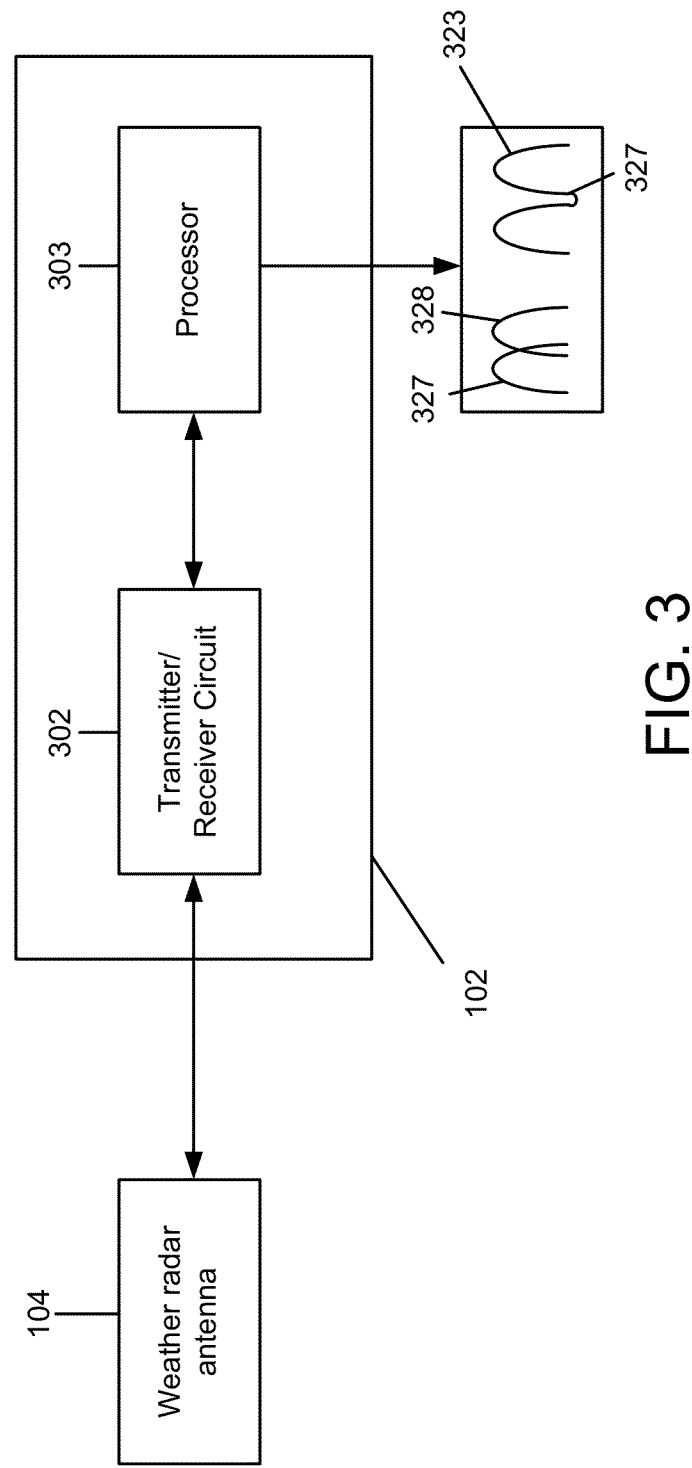
FIG. 3 is a more detailed block diagram of a weather radar system, according to an exemplary embodiment.

Referring to FIG. 3, a more detailed block diagram of radar system 102 is shown, according to an exemplary embodiment. In FIG. 3, radar system 102 is embodied as a weather radar system 102. Weather radar system 102 is coupled to weather radar antenna 104. Weather radar antenna 104 may scan the atmosphere and provide weather radar returns for weather radar system 102. According to one exemplary embodiment, the scan may be a vertical scan, an elevation scan or partially vertical scan for sensing weather and hazards, such as windshear. Alternatively, the scans may be in one or multiple directions.

Transmitter/receiver circuit 302 may be configured to receive radar returns received by weather radar antenna 104 and is also coupled to processor 303. Transmitter/receiver circuit 302 may provide processor 303 with radar return data to analyze and may alter radar return data in a number of ways. In one embodiment, processor 303 may combine or sum two portions of radar return data that are provided by receive portions of circuit 302. Processor 303 can also alter a representation of the power and/or phase of the weather radar return, according to an exemplary embodiment. Preferably, processor 303 operates to generate null response 323 by combining portions of radar return data. Processor 303 can perform operations to steer and/or tune null response 323 as described below.

In one exemplary embodiment, radar return data may be separated into two portions (e.g. an upper half 327 and a lower half 328 (e.g., sub-aperture beams)). Halves 327 and 328 are adjusted and combined to achieve null response 323. For example, according to an exemplary embodiment, the lower half 328 of radar return data may be taken out of phase by 180 degrees and combined with an upper half 327 to achieve null response 323 (a difference operation). Other exemplary embodiments may separate radar return data differently (e.g. into more than two portions), and alter each portion according to different principles. Although halves 327 and 328 are shown in FIG. 3, thirds, quarters, eighths, other fractions, combinations thereof, and other relationships can be utilized.

Null response 323 is utilized to reduce ground clutter for weather detection. System 102 advantageously directs null 327 of null response 323 towards the ground, thereby providing rejection of ground clutter while using the returns for other detection, such as windshear detection or other hazard detection. Thus, null response 323 provides a narrower response that allows ground clutter to be removed and yet provides suitable detection of volume hydrometers from weather.

Advantageously, system 102 allows lower altitudes to be sampled due to the use of null response 323. The peak divergence in velocity tends to occur at the lower altitudes in windshear and microburst events. As sample altitude increases, air flow in windshear and microburst events becomes more vertical as opposed to radial and hence less easily detected by weather radar systems. Therefore, sampling at lower altitudes advantageously can provide a better estimate of a windshear microburst event.

System 102 preferably uses aircraft altitude and radar range to determine the appropriate angle at which to aim beam 106 (FIG. 1) so null 328 is directed toward ground clutter. Various systems can be utilized to determine range and altitude. Altitude can be determined by system 102 or by an air sensor or GPS. Similarly, range can be determined by system 102, or other navigation devices. Range and relative altitude can be used to determine tilt angle of antenna 104

$$\left(\text{e.g., ARCSIN}\ominus = \frac{\text{Altitude}}{\text{Range}} + \text{or} - \text{offset}\right).$$

The offset can be due to antenna position, configuration, aircraft position, etc. As discussed below, null 328 can be multiple nulls optimized for different ranges.

Null response 323 can be created in a variety of ways. In one exemplary embodiment, null response 323 can be created by combining the first portion with an adjusted second portion of radar return data. In another exemplary embodiment, null response 323 can be created by combining the second portion with an adjusted first portion of radar return data. In yet another exemplary embodiment, null response 323 can be created by combining an adjusted first portion with an adjusted second portion of radar return data. In an exemplary embodiment, the adjusted first portion or second portion may be adjusted using a phase delay of 180 degrees or by adjusting amplitude.

In one exemplary embodiment, a radar antenna, such as weather radar antenna 104, can sweep across the atmosphere and analyze null response 323 to determine weather hazards. As part of the characteristics of null response 323, power is reduced to a minimum at a location in the middle of the first and second portions of the radar return data. As discussed above, null response 323 preferably has a much narrower bandwidth, allowing for separation of ground clutter and weather conditions, among other responses.

The sharpening ratio associated with null response 323 may be greater than 5:1, according to an exemplary embodiment. According to another exemplary embodiment, the sharpening ratio may be greater than 10:1. Using null response 323, the resulting data about weather conditions can be used by system 102 and be displayed on flight displays 20 in aircraft 10 for pilot/copilot analysis, such as in windshear or other hazard detection. In a preferred embodiment, null response 323 can include multiple nulls, each optimized for a particular range. Processor 303 can apply a tuning vector to radar return data to achieve multiple nulls in one embodiment. The tuning vector can be a function of range with different elements of the tuning vector pointed to different ranges. The tuning vector can be a complex number, such as, an array of complex numbers, so that a number of nulls are optimized for different ranges (e.g., 1 mile, 1.5 miles, 2 miles, etc.).

Figure 4A:
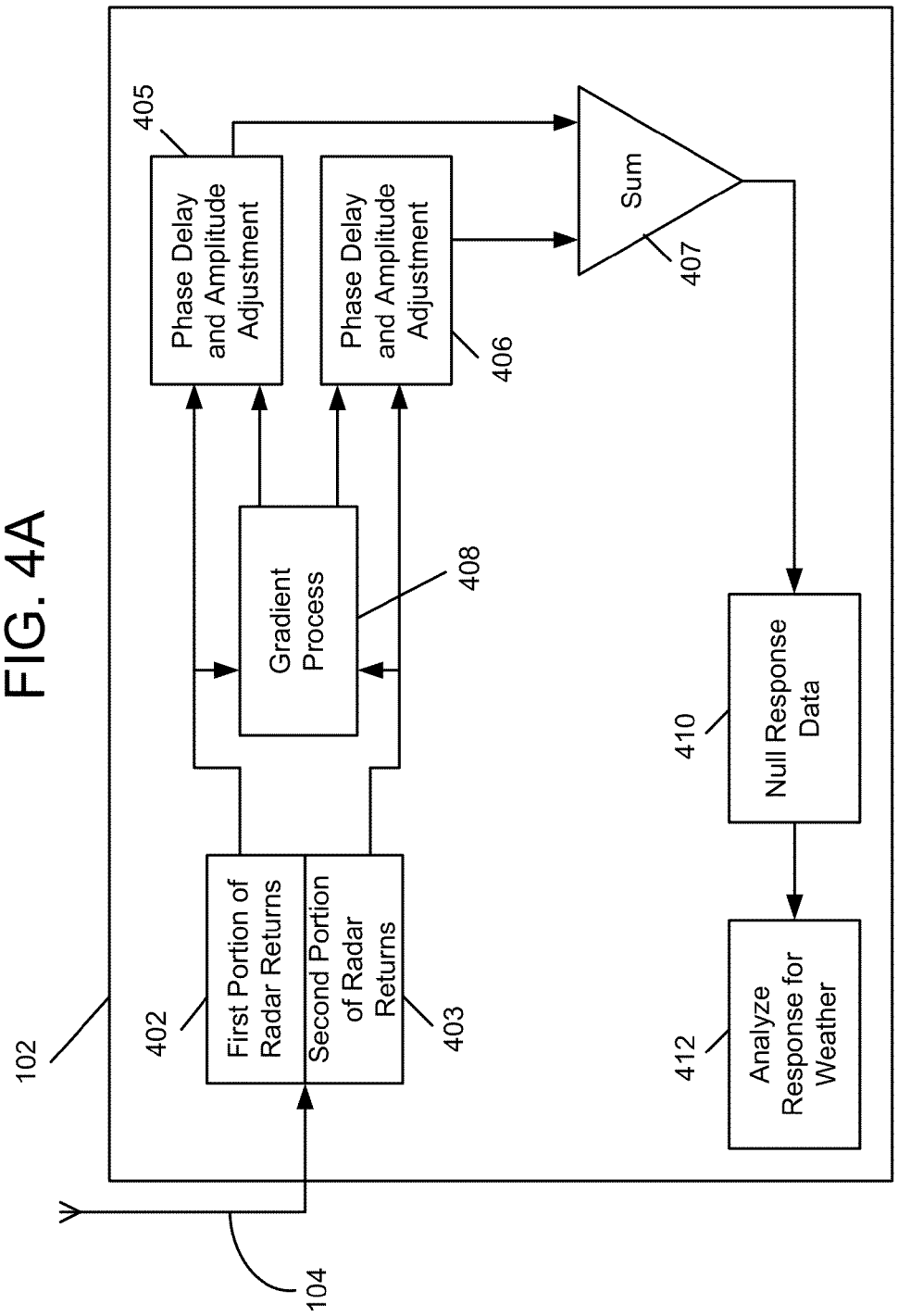
FIG. 4A is a more detailed block diagram of a receiver section of a weather radar system, according to an exemplary embodiment.

Referring to FIG. 4A, a more detailed block diagram of a weather radar system 102 is shown, according to an exemplary embodiment. Weather radar system 102 receives radar returns from weather radar antenna 104. The returns can be associated with a horizontal weather radar scan, such as a windshear scan in one embodiment. Processor 303 separates the radar returns into a first portion 402 and a second portion 403. Portions 402 and 403 can be stored separately or sequentially. According to an exemplary embodiment, processor 303 separates two different portions of weather radar antenna 104. According to other exemplary embodiments, a receive circuit (e.g. circuit 302) can separate the radar returns into more than two portions.

For each portion that the radar returns may be divided into, a phase delay and amplitude adjuster 405 and 406 is used. The use of phase and amplitude adjustment can result in deeper nulls. According to an exemplary embodiment, a phase delay of approximately 180 degrees may be applied to only one portion of the radar returns. According to another exemplary embodiment, an amplitude adjustment may be used to amplify portions of the radar return to compensate for signal degradations. Adjusters 405 and 406 may use a gradient process 408 to assist in adjusting the radar returns. The altered radar return portions are summed together using a summer 407.

In a preferred embodiment, the gain and phase adjustment of only one sub-channel is required. (Only one signal need be adjusted to produce the null). Gradient process 408 preferably measures the success of producing a null, moves gain and/or phase, and recomputes the success of the null formation process. If successful in improving the null, the change is kept and the local change in gain or phase is recorded along with a score of the null formation process. The local slope of the null formation process verses the gain or phase parameter change is produced. The local slope is used to predict a new value or gain or phase that optimizes the null formation process. Preferably, process 408 receives the current gain and phase adjustment parameters and the derived null formation score.

Process 408 can be implemented according to various techniques: RLS (recursive least square), steepest descent, and others. The gradient optimizer process described above is exemplary only.

According to an exemplary embodiment, amplitude may be adjusted in a variety of ways. A multitude of functions (e.g. multiplication, division, vector applications, and other mathematical and logic operations) may be used to adjust amplitude. For example, in an exemplary embodiment, a tuning vector can be multiplied to a portion of radar returns to adjust the returns to compensate for variations in sub-aperture beam gains and phases that degrade the performance of the antenna in generating deep nulls with narrow beam widths. These variations may be produced by either errors in gain or phase in the antenna aperture or by variations in radome characteristics. Variations in radome characteristics can require possible gain and phase adjustments to be made during antenna movements.

In another exemplary embodiment, a steering vector can be multiplied to a portion of radar returns to amplify the reading. The steering vector may alter the radar return data such that data received is representative of an antenna null being scanned at an angle different than antenna bore site. For example, radar return data provided by antenna 104 can be displaced 2.5 degrees from the normal sum beam pointing angle. (See FIG. 8). Other angles can be utilized.

Preferably, adjusters 405 and 406 and summer 407 are implemented in digital signal process software or other software. Alternatively, hardware may be available to implement adjusters 405 and 406 and summer 407. It should be apparent to those skilled in the art the various software and hardware that may be used to implement these computations. Displacement of formed nulls may be used to hold a target angle region in the null as antenna 104 is moved. This allows many samples of the nulled data to be processed together and to ensure received radar pulse are collected at all desired angles even when the major transmit/receive cycle may have a low sample rate. This sample rate would cause the radar pulses to skip the narrow formed nulls for some targets.

After summer 407 is applied to the radar return data, the radar return portions can be provided through gradient process 408. Gradient process 408 is utilized to fine tune the adjustments of the portions to form a best case null response 323. Inaccuracies associated with the radar return process can be compensated for by gradient process 408. In one exemplary embodiment terrain elevation data is analyzed with respect to known data heights to adjust the first portion and second portion of radar returns. In another exemplary embodiment, the null response and antenna characteristics are analyzed to determine the appropriate adjustments for null response 323. Null response data 410 and how the data changes with changes in gain/phase adjustment can be used to estimate new gain/phase adjustment values that optimize null formation.

Once the radar return portions are summed, null response data 410 is provided to an analyzer 412. According to an exemplary embodiment, analyzer 412 receives data 410 and determines weather characteristics associated with the radar return portions.

Figure 4B:
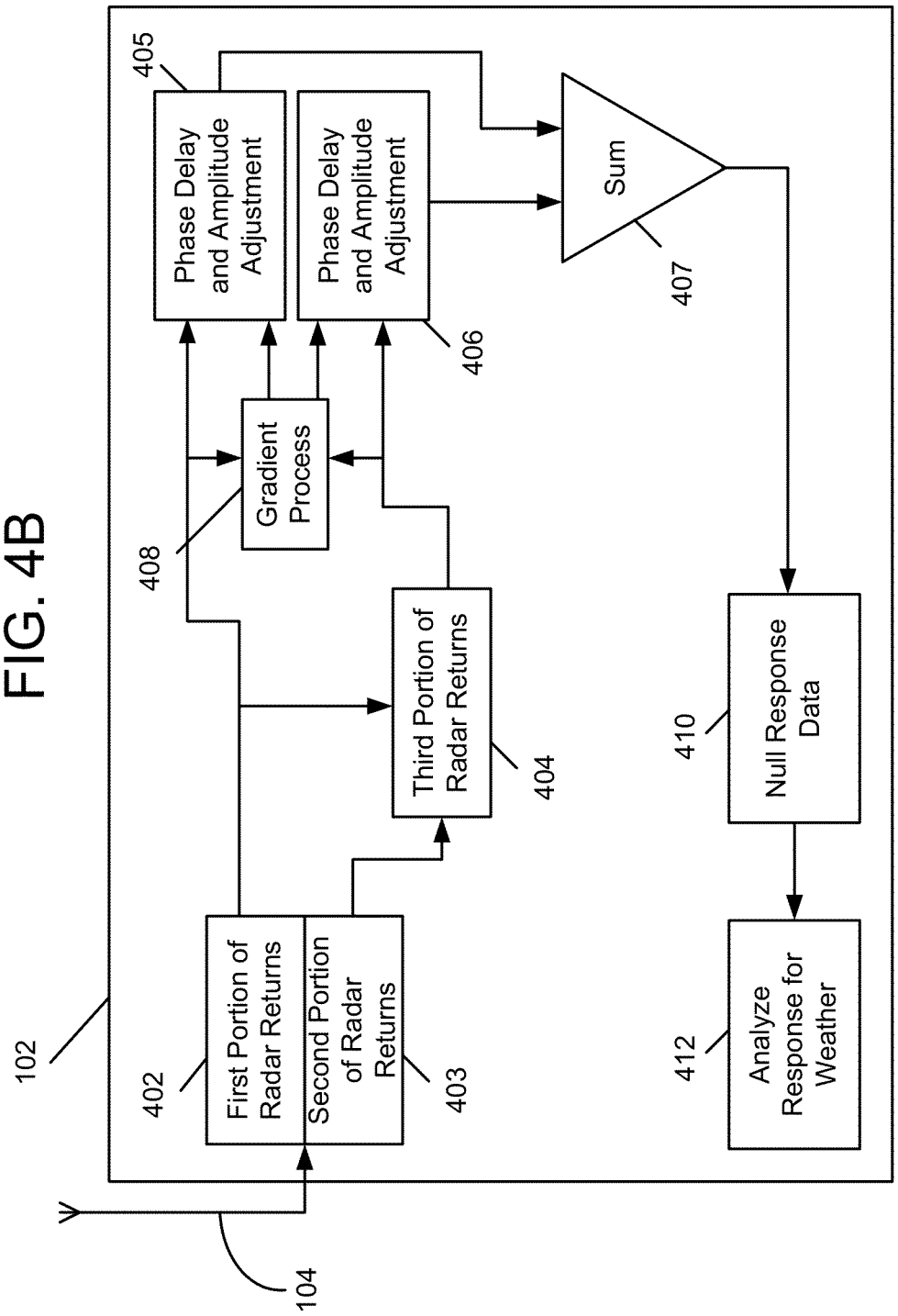
FIG. 4B is a more detailed block diagram of a receiver section of a weather radar system, according to another exemplary embodiment.

Referring to FIG. 4B, a more detailed block diagram of a weather radar system 102 is shown, according to another exemplary embodiment. Weather radar system 102 receives radar returns from weather radar antenna 301. Processor 303 within weather radar system 102 receives the radar returns as a first portion 402 and a second portion 403.

Weather radar antenna 104 may provide various forms of radar return data for processor 303. Second portion 402 includes first portion 403 of radar returns. Using first portion 402 of radar returns and second portion 403 of radar returns, processor 303 may subtract using subtractor 404 first portion 402 of radar returns from second portion 403 of radar returns to determine a third portion of radar returns that represents radar returns not in first portion 402 of radar returns. First portion 402 of radar returns and the third portion of radar returns can have a phase delay and/or amplitude adjustment applied to them and eventually be summed to determine a null response.

In one embodiment, first portion 402 is one half of antenna 301 and second portion 403 is the whole antenna response. In one embodiment, one half of antenna 301 is shorted out via a switch when first portion 402 is collected.

Referring to FIG. 5, a flow diagram of a method 500 of sensing weather using a weather radar system 102 is shown, according to an exemplary embodiment. The first step is to initiate system 102 (step 502). The initialization of system 102 may be triggered by pilot request or the aircraft may automatically generate the initialization of the system. At a step 503, system 102 performs a scan via antenna 104. The scan can be a horizontal scan for windshear in one embodiment. System 102 preferably steers the location associated with the null towards ground. Weather radar system 102 receives radar return data (step 504). The radar return data may provide data about weather conditions, terrain, obstacles, or any combination thereof. Weather radar system 102 analyzes the radar return data from the radar (step 506). The returns may be analyzed for various purposes.

Once the radar return data is received, the radar return data may be divided into two separate portions (step 508). According to one exemplary embodiment, the radar return data may be split up into an upper half portion and a lower half portion. In other exemplary embodiments, the radar return data may be split up into a left half portion and a right half portion or any other method of splitting the radar return data into two portions may be implemented. According to yet other exemplary embodiments, the radar return data may be split up into more than two portions.

Once the radar return data has been portioned, the weather radar system sums the first portion with an out of phase second portion (step 510), according to an exemplary embodiment. In other exemplary embodiments, the radar system may sum an out of phase first portion with an out of phase second portion, or may sum multiple portions that are either in phase or out of phase. The radar system may also choose to perform other functions (e.g. multiplication, division, subtraction) on the various portions.

The summation of the various portions or other more vertical operation provides a null response (step 512). The null response may be designed to provide greater resolution of terrain with respect to weather, according to an exemplary embodiment. The null response may be varied by how the various portions of the radar scan are altered. In an exemplary embodiment, a first portion summed with an out of phase second portion may provide a desired null response. In another exemplary embodiment, an out of phase first portion may be summed with an out of phase second portion to provide another desired null response.

According to one exemplary embodiment, the null for the null response may be between 0.0 degrees and 0.6 degrees. According to other exemplary embodiments, the null for the null response may be between 0.2 degrees and 0.4 degrees, or 0.5-3.0 degrees and reaches a peak rejection of −120 dB. The null response may also be normal to antenna 104, according to another exemplary embodiment. It should be apparent to those skilled in the art that the null response may be altered in a plurality of ways to produce a desirable and useful result for a particular situation.

The null response is used to detect weather (step 514). Various weather analysis techniques can be used to detect various types of hazards using the null response.

In one embodiment, step 506 can be skipped. In another embodiment, method 500 is performed during approach. System 102 can be configured to automatically perform method 500 or steps 503-514 during approach or take-off.

Figure 6:
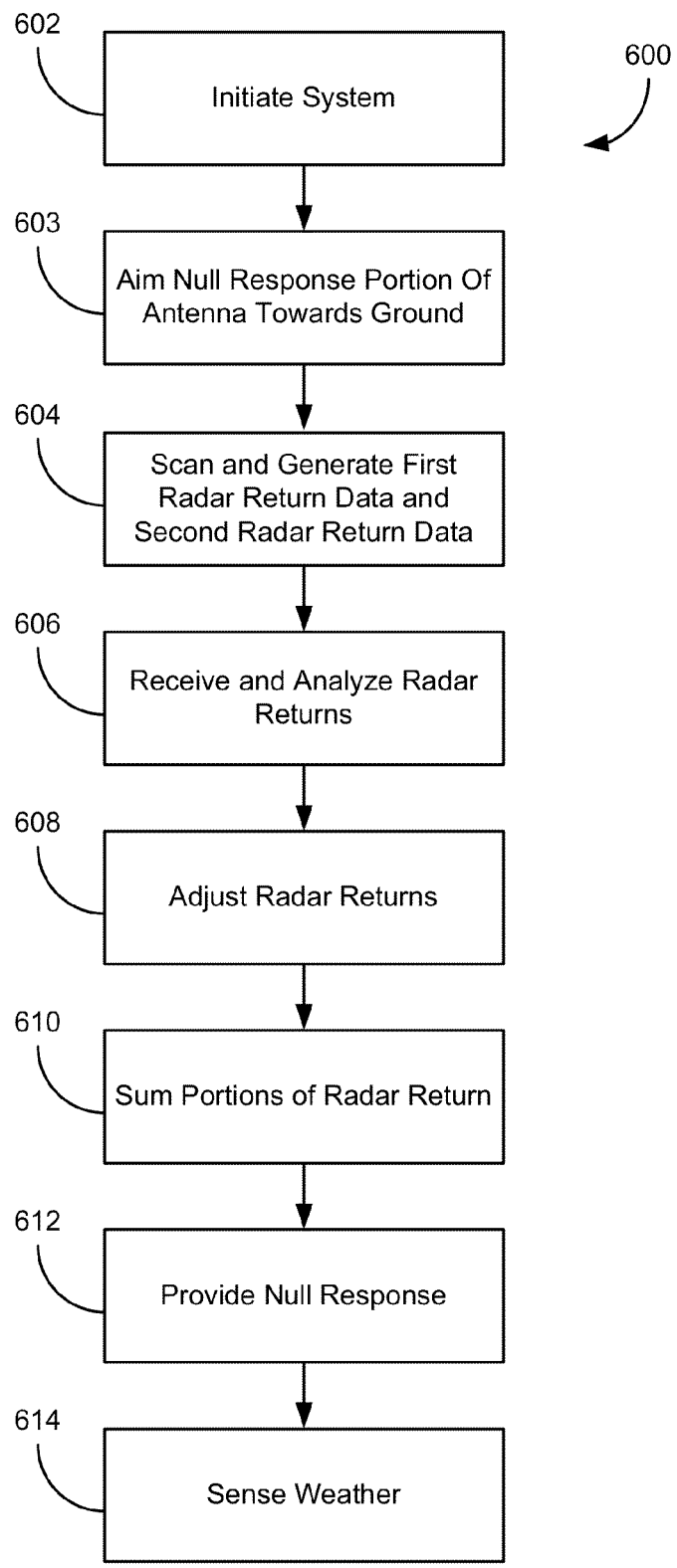
FIG. 6 is a flow chart of a method of sensing weather using an airborne weather radar, according to another exemplary embodiment.

Referring to FIG. 6, a flow diagram of a method 600 of sensing weather using weather radar system 102 is shown, according to another exemplary embodiment. The first step is to initiate the system (step 602). At a step 603, system 102 performs a scan via antenna 104. The scan can be a horizontal scan for windshear in one embodiment. System 102 preferably steers the location associated with the null towards ground. The initialization of system 102 may be triggered by pilot request or the aircraft may automatically generate the initialization of the system. Once the system is initialized, weather radar system 102 scans an area and generates a first radar return data and a second radar return data (step 604). The radar return data may provide data about weather conditions, terrain, obstacles, or any combination thereof. The radar may divide the radar return data in a variety of ways. In one exemplary embodiment, a weather radar antenna may be configured to use one portion to return a first radar return data and a second portion to return a second radar return data. A first portion of radar return data and second portion of radar return data may represent a lower half, an upper half, a left half or a right half of an area. In other exemplary embodiments, the radar return data may be portioned into more than two portions in a variety of ways. In an exemplary embodiment, the first radar return data may be received by the weather radar system before the second radar return data. In other exemplary embodiments, the various radar return data may arrive in any order at the weather radar system, or all radar return data may arrive concurrently at the weather radar system.

A radar system, such as a weather radar system, then receives and analyzes the radar return data from the radar (step 606). For example, the returns may be analyzed to determine weather conditions.

Once the radar return data is received, the radar return data may be adjusted (step 608). For example, a tuning vector may be multiplied to portions of a radar return data. According to one exemplary embodiment, the radar return data may be multiplied to a steering vector. In another exemplary embodiment, the radar return data may be adjusted using a gradient process. The adjustments may be adaptively performed, according to an exemplary embodiment. As discussed above, the tuning vector may be a complex set of numbers for providing nulls at different ranges. The nulls can be calculated after the radar returns are received and stored.

Once the radar return data has been portioned and adjusted, the radar system sums the portions of the radar return together (step 610), according to an exemplary embodiment. In an exemplary embodiment, radar system 102 may sum an out of phase first portion with an out of phase second portion, may sum an out of phase first portion with a second portion, or may sum multiple portions that are either in phase or out of phase.

The summation of the various portions provides a null response (step 612). In certain terrain detecting applications, the null response may be designed to provide greater resolution of terrain with respect to weather. In certain weather detecting applications, the null response can be designed to detect certain types of weather and/or weather events. The null response may be varied by how the various portions of the radar scan are altered. In an exemplary embodiment, a first portion summed with an out of phase second portion may provide a desired null response. In another exemplary embodiment, an out of phase first portion may be summed with an out of phase second portion to provide another desired null response.

According to one exemplary embodiment, the null for null response may be between 0.0 and 0.6 degrees. According to other exemplary embodiments, the null for null response may be between 0.2 degrees and 0.4 degrees or 0.5-3.0 degrees. The null for null response may also be normal to the antenna, according to another exemplary embodiment. The sharpening ratio associated with the null response may be greater than 5:1 number, according to an exemplary embodiment. According to another exemplary embodiment, the sharpening ratio may be greater than 104. The null response may be altered in numerous ways to produce a desirable and useful result for a particular situation.

The null response is used to determine weather (step 614). Method 600 can be performed automatically during approach or take-off. Altitude can be used to sense take-off or approach. Alternatively, a phase-of-flight sensor can be utilized.

Figure 7:
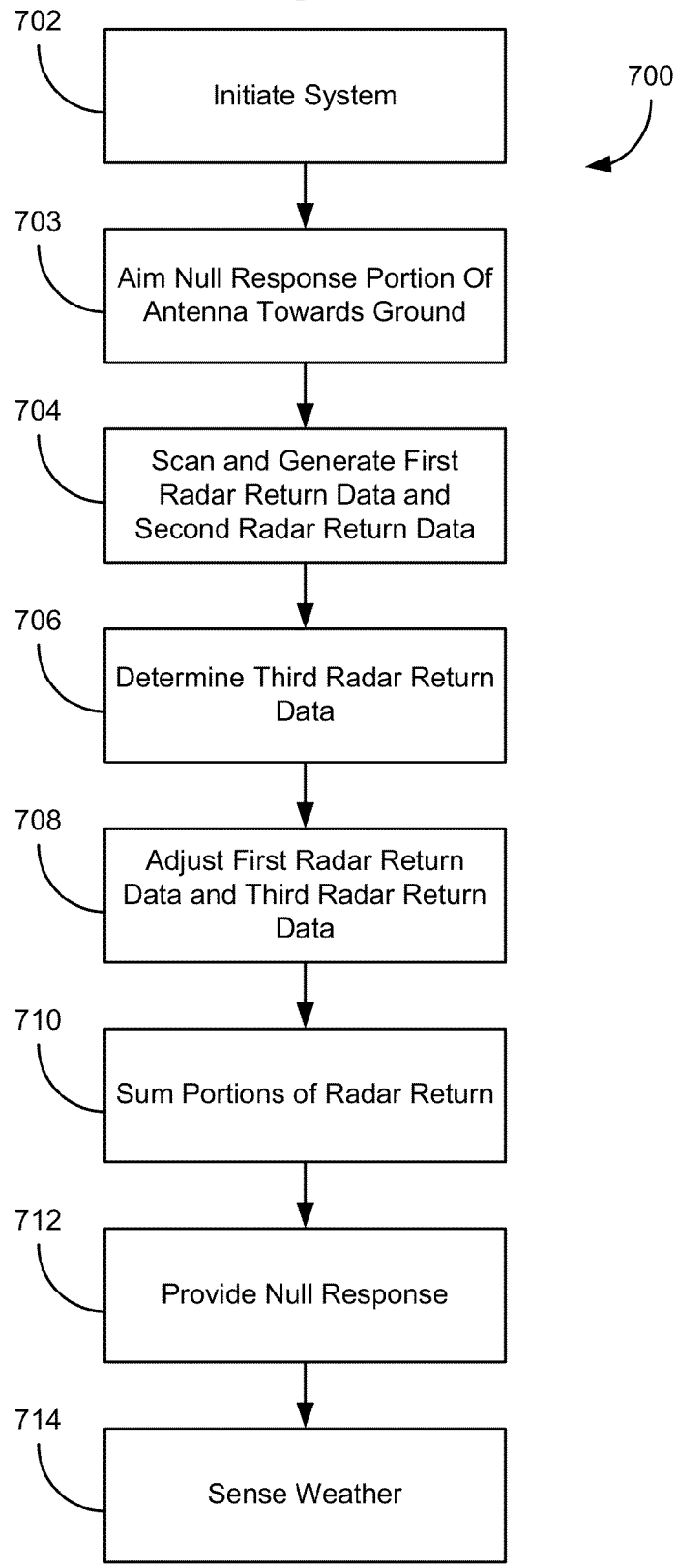
FIG. 7 is a flow chart of a method of sensing weather using an airborne weather radar, according to yet another exemplary embodiment.

Referring to FIG. 7, a flow diagram of a method 700 of sensing weather using weather radar system 102 is shown, according to yet another exemplary embodiment. The first step is to initiate the system (step 702). The initialization of the system may be triggered by pilot request or the aircraft may automatically generate the initialization of the system. Once the system is initialized system 102 performs a scan via antenna 104. The scan can be a horizontal scan for windshear in one embodiment. System 102 preferably steers the location associated with the null towards ground or otherwise associates the null with the ground at a step 703. A radar, such as a weather radar system 102, scans an area and generates a first radar return data and a second radar return data (step 704). The radar return data may provide data about weather conditions, terrain, obstacles, or any combination thereof. The radar may divide the radar return data in a variety of ways.

In one exemplary embodiment, a weather radar antenna may be configured to use one portion to return a first radar return data and a second portion to return radar return data representing an entire area. A first portion of radar return data may represent a lower half, upper half, left half, or right half of an area. A second portion of radar return data may represent an entire area. In an exemplary embodiment, the first radar return data may be received by the weather radar system before the second radar return data. In other exemplary embodiments, the various radar return data may arrive in any order at the weather radar system, or all radar return data may arrive concurrently at the weather radar system.

Third radar return data may be determined using the first radar return data and the second radar return data (step 706). For example, the first radar return data may represent an upper half of an area scanned and the second radar return data may represent an entire scanned area. The weather radar system may subtract the first radar return data from the second radar return data to produce a third radar return data that represents the lower half of an scanned area. The third radar return data may be created in other various ways, according to various exemplary embodiments.

Once the radar return data is received, the radar return data may be adjusted (step 708). For example, a vector may be multiplied to a radar return data or a radar return data portion. According to one exemplary embodiment, the radar return data may be multiplied to a steering vector. In another exemplary embodiment, the radar return data may be multiplied to a tuning vector.

As discussed above, a tuning vector may be used modify the null pointing angle. This also allows the null to continue to point to the same angle in vertical space even the antenna is moving vertically. This allows multiple samples of radar null at a given direction. Using multiple samples allow null estimates to be improved by either coherent or incoherent averaging methods.

The tuning vector may be used to correct for imprecision between sub-aperture beams or to steer the null that is constructed from the multiple beams. Steering is important for more than just the integration argument. Applicant has found that the pulse/receive cycle may not line up for a given target, at the null. This can require the antenna speed to be slowed (or that the transmitter pulse frequency be increased) to make sure at least one pulse set would fall into the null. Thus the null can be steered or adjusted over the entire space, effecting the alignment of pulses with the null.

Once the radar return data has been portioned, the radar system sums the portions of the radar return together (step 710), according to an exemplary embodiment. In an exemplary embodiment, the radar system may sum an out of phase first portion with an out of phase third portion, may sum an out of phase first portion with a third portion, or may sum multiple portions that are either in phase or out of phase.

The summation of the various portions then provides a null response (step 712). The null response may be designed to provide greater resolution of terrain with respect to weather, according to an exemplary embodiment. The null response may be varied by how the various portions of the radar scan are altered. In an exemplary embodiment, a first portion summed with an out of phase third portion may provide a desired null response. In another exemplary embodiment, an out of phase first portion may be summed with an out of phase third portion to provide another desired null response. The sharpening ratio associated with the null response may be greater than 5:1, according to an exemplary embodiment. According to another exemplary embodiment, the sharpening ratio may be greater than 10:1. The null response may be tuned for the best cancellation ratio between the first portion of the radar return data and the third portion of the radar return data. It should be apparent to those skilled in the art that the null response may be altered in a plurality of ways to produce a desirable and useful result for a particular situation. The null response is preferably used to sense weather (step 714).

Figure 8:
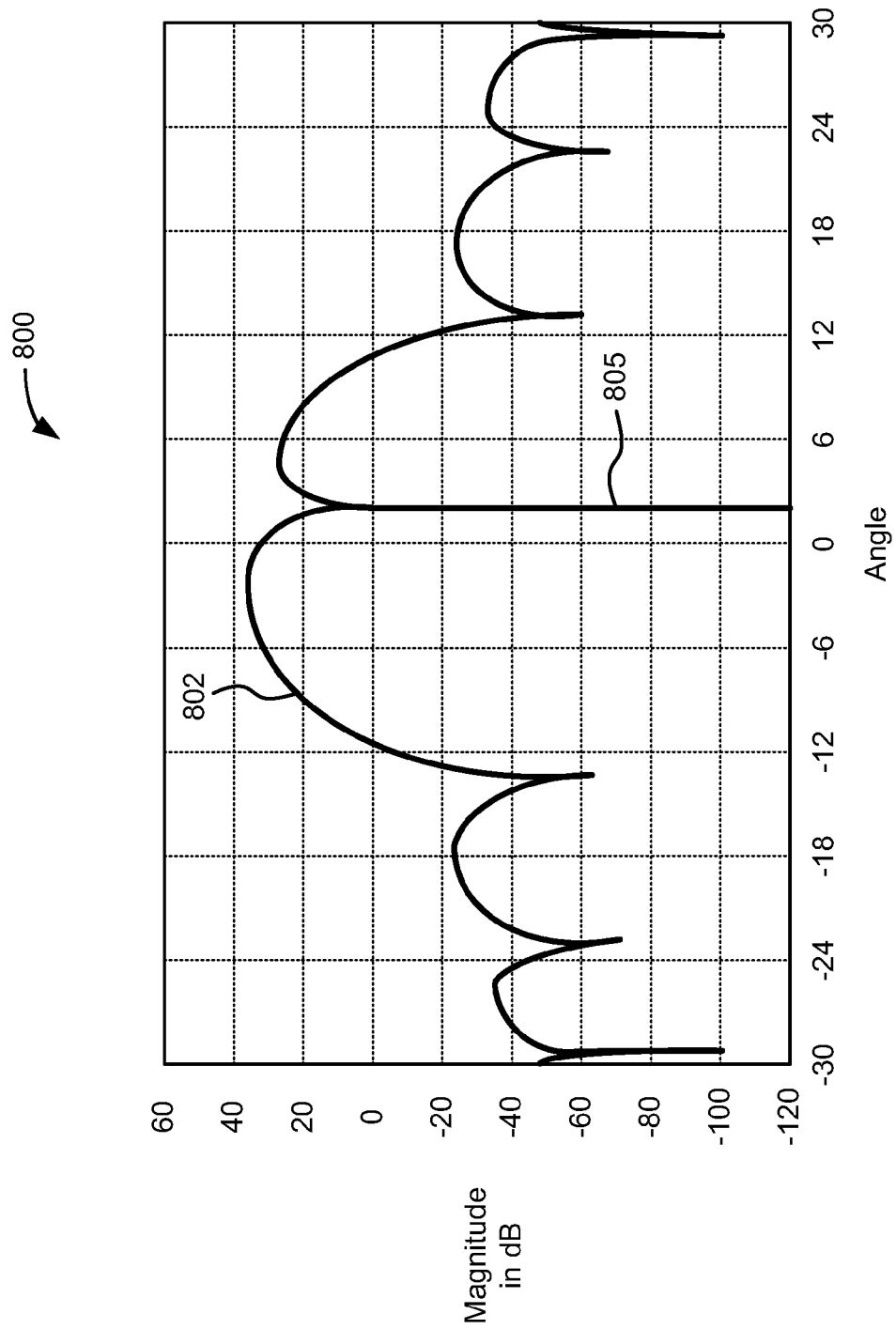
FIG. 8 is a representation of relative gain in dB versus antenna angle of a null response and for use in the system illustrated in FIG. 3 and/or processes illustrated in FIGS. 5-7 according to another exemplary embodiment.

With reference to FIG. 8, a representation 800 includes a response 802. An X-axis represents vertical offset angle in degrees and Y-axis represents magnitude of power in dB. Response 802 is an exemplary null response provided according to the systems and processes described with reference to FIGS. 1-7. A null 805 of response 802 has a width of 0.5 to 3.0 degrees in one embodiment and reaches a maximum of −120 dB. Null response 802 can be shaped differently than as shown in FIG. 8 without departing from the scope of the invention.

Preferably, null response 802 is formed by a split aperture antenna according to the following exemplary equation: NULL=SUM−K*[LOWER HALF], where SUM=[UPPER HALF]+[LOWER HALF] and NULL=[UPPER HALF]−[LOWER HALF]. NULL is null response 802, [UPPER HALF] is return data associated with the upper half of antenna 104, and [LOWER HALF] is return data associated with the lower half of antenna 104 in one embodiment. The value of K depends on numerous factors. For example, in the case where there is no Doppler, the value of K can be 2 in one embodiment. Preferably, the null can be moved in radar time and deeper nulls can be achieved by manipulating magnitude in addition to phase. Null can be steered by computing the first difference in the received angle from either the full sum beam, SUM, to the half aperture [LOWER HALF] or [UPPER HALF] or from one half aperture [LOWER HALF] to the other [UPPER HALF]. The phase response over the difference being can also be used to predict any required angular offsets to produce the null steering.

The SUM, [LOWER HALF], and [UPPER HALF] data can be obtained by any number of transmit and receive techniques. Portions of antenna 104 can be shorted during transmit or receive to provide the data. Alternatively, data from the entire aperture be selectively removed to obtain [LOWER HALF] and [UPPER HALF] data.

Response 802 can be achieved using either two receivers sampling two halves of antenna 104 or using a single receiver sequentially sampling two halves of antenna 104. In a preferred embodiment, system 102 can achieve fully comply DO-220 windshear certification with 12 and 14 inch antennas.

Although specific steps are shown and described in a specific order, it is understood that the method may include more, fewer, different, and/or a different ordering of the steps to perform the function described herein. Flow diagrams 500, 600, and 700 can be implemented in software on a computing platform associated with a weather radar system, a terrain guidance system, or other aviation device. Preferably, diagrams 500, 600, and 700 are implemented on a weather radar computing platform such as an RDR 4000 or WXR-2100 system.

The exemplary embodiments and representations illustrated in the figures and described herein are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the radar system as shown in the various exemplary embodiments is illustrative only. Although only a few embodiments of the present application have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors and orientations) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application as defined in the appended claims. The order or sequence of any process or method steps may be varied or re-sequenced according to alternative embodiments. In the claims, any means-plus-function clause is intended to cover the structures described herein as performing the recited function and, not only structural equivalents, but also equivalent structures. Other substitutions, modifications, changes and omissions may be made in the design, operating conditions and arrangement of the exemplary embodiments without departing from the scope of the present application as expressed in the appended claims.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store a desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen. It is understood that all such variations are within the scope of the application. Likewise, software implementations of the present application could be accomplished with standard programming techniques with rule-based logic and other logic to accomplish the various connection steps, processing steps, comparison steps and/or decision steps.

The foregoing description of embodiments of the application has been presented for purposes of illustration and description. It is not intended to be exhaustive or to limit the application to the precise form disclosed, and modifications and variations are possible in light of the above teachings, or may be acquired from practice of the application. The embodiments were chosen and described in order to explain the principles of the application and its practical application to enable one skilled in the art to utilize the application in various embodiments and with various modifications as are suited to the particular use contemplated.

What is claimed is:

1. A method of using an airborne weather radar system coupled to a weather radar antenna, the method comprising:
   determining an angle for steering a null toward ground, the null being a rejection attenuation across an angular range;
   combining at least two radar returns to form null response data, wherein the null is located in the null response data and the angle and a range to the ground are used to locate the null at the ground to alleviate ground clutter;
   sensing weather using the null response data, wherein the angle is determined before the sensing; and
   estimating windshear or microburst events.

2. The method of claim 1 wherein returns above the null are used to determine windshear hazards, wherein the returns are from a horizontal scan with the null located at the ground across the horizontal scan.

3. The method of claim 2 wherein combining operates to tune the null for the best cancellation ratio between a first beam associated with the first radar returns and a second beam associated with the second radar returns.

4. The method of claim 1 wherein the at least two radar returns include first radar returns and second radar returns, and the first radar returns are received by a first receiver and the second radar returns are received by a second receiver.

5. The method of claim 4 wherein the first radar returns are received before the second radar returns.

6. The method of claim 1 wherein combining applies a tuning vector to achieve multiple nulls, where different elements of the tuning vector are pointed to respective different ranges from the weather radar antenna to the ground clutter.

7. A weather radar system coupled to a weather radar antenna, the weather radar system comprising:
   a receive circuit for receiving radar returns received by the weather radar antenna and providing radar return data; and
   a processor coupled to the receive circuit and receiving the radar return data, the processor configured to determine an angle for steering a null toward ground, the null being a rejection attenuation across an angular range, to direct the null so that the null is correlated with the ground during weather sensing to reduce ground clutter, to combine at least two radar returns to form null response data having the null, to sense weather using the null response data to sample at lower altitudes, and to estimate windshear or microburst events based on the sampling at the lower altitudes, wherein the angle and a range to ground are used to locate the null at the ground before the null response data is formed;
   wherein the combining applies a tuning vector to achieve multiple nulls, where different elements of the tuning vector are pointed to respective different ranges from the weather radar antenna to the ground clutter.

8. The weather radar system of claim 7 wherein a weather radar return power of the radar returns is representative of power received by the weather radar antenna scanning in at least one direction, wherein the angle is determined according to the following relation: ARCSIN (Altitude/Range).

9. The weather radar system of claim 7 wherein the null is achieved by multiplying a steering vector by received data returns of a first portion or a second portion of the weather radar antenna.

10. The weather radar system of claim 9 wherein the processor performs a gradient process when the processor adjusts phase or power.

11. The weather radar system of claim 10 wherein a sharpening ratio associated with the null response is greater than 10:1 when compared to a beam generated by an antenna of similar size to the weather radar antenna where the received data returns of the first and second portions are summed together.

12. The weather radar system of claim 9 wherein the receive circuit includes a first receive circuit for the received data returns of the first portion and a second receive circuit for the received data returns of the second portion.

13. The weather radar system of claim 7 wherein the null reduces ground clutter and allows sensing of low level windshear with antennas of smaller size than the weather radar antenna.

14. An apparatus for sensing weather, the apparatus comprising:
   means for sampling weather radar return data associated with a scan by a weather radar antenna;
   means for associating a null with the ground, whereby the null reduces ground clutter associated with the weather radar return data, and combining at least two radar returns to form null response data having the null, the means for associating determining an angle for steering the null toward the ground, the null being a rejection attenuation across an angular range;
   wherein the null is located in the null response data and the angle and a range to the ground are used to locate the null at the ground to alleviate ground clutter; and
   means for sensing weather using the null response data to sample at lower altitudes and estimating windshear or microburst events based on the sampling at the lower altitudes.

15. The apparatus of claim 14, wherein the null is formed by multiplying at least one of the two portions of the weather radar return data by a tuning vector.

16. The apparatus of claim 15, wherein the null is steered by multiplying by a steering vector.

17. The apparatus of claim 14 wherein first and second portions of the weather radar return data are from antenna halves used to form the null.

18. The method of claim 6 wherein the combining is adaptively performed.

* * * * *